United States Patent [19]
Takahashi

[11] Patent Number: 5,855,193
[45] Date of Patent: Jan. 5, 1999

[54] INDUCTION SYSTEM FOR OUTBOARD MOTOR

[75] Inventor: Masanori Takahashi, Hamamatsu, Japan

[73] Assignee: Sanshin Kogyo Kabushiki Kaisha, Hamamatsu, Japan

[21] Appl. No.: 918,330

[22] Filed: Aug. 26, 1997

[30] Foreign Application Priority Data

Aug. 26, 1996 [JP] Japan .................................. 8-223756

[51] Int. Cl.⁶ .................................................. F02M 35/10
[52] U.S. Cl. ...................................................... 123/184.48
[58] Field of Search ........................ 123/184.35, 184.43, 123/184.48, 184.51

[56] References Cited

U.S. PATENT DOCUMENTS

| | | | |
|---|---|---|---|
| 4,763,612 | 8/1988 | Iwanami | 123/184.36 |
| 4,766,853 | 8/1988 | Iwanami | 123/184.37 |
| 4,782,797 | 11/1988 | Kurahashi | 123/184.37 |
| 4,809,647 | 3/1989 | Masumoto et al. | 123/184.37 |
| 4,811,697 | 3/1989 | Kurahashi | 123/184.37 |
| 4,898,144 | 2/1990 | Kobayashi et al. | 123/432 |
| 5,005,534 | 4/1991 | Wahsizu et al. | 123/184.43 |
| 5,007,386 | 4/1991 | Washizu et al. | 123/184.43 |
| 5,127,370 | 7/1992 | Suzuki et al. | 123/184.37 |
| 5,638,785 | 6/1997 | Lee | 123/184.35 |

*Primary Examiner*—David A. Okonsky
*Attorney, Agent, or Firm*—Knobbe, Martens, Olson & Bear LLP

[57] ABSTRACT

A number of embodiments of induction systems for outboard motors wherein the induction system can be tuned to provide good performance under high low speed by utilizing two plenum chambers and a control for controlling the effective length of the intake passage serving the combustion chamber. Both inline and V-type embodiments are disclosed.

16 Claims, 10 Drawing Sheets

INDUCTION SYSTEM FOR OUTBOARD MOTOR

BACKGROUND OF THE INVENTION

This invention relates to an outboard motor and more particularly to an improved induction system for an outboard motor.

As is well known, the engine in an outboard motor is required to operate over a wide variety of engine speeds and engine loads. This presents a significant problem in connection with the design of many components, particularly the induction system. An induction system for an internal combustion engine generally is a compromise between obtaining good performance under low and mid-range conditions, and maximum power output. However, because of the particular utilization of outboard motors, it is desirable that they provide good torque curves at both low and mid-range speeds, and also at high speeds. Hence, the conventional induction systems utilized for outboards have had to compromise between these two dissimilar goals.

It has been proposed in automotive engines to employ so-called dual or split induction systems that provide optimum tuning under two widely spaced engine speed and load conditions. However, this generally involves the use of complicated induction systems and ones which are too bulky to admit themselves to utilization in outboard motors. In an outboard motor, as is well known, the engine generally operates so that its output shaft rotates about a vertically-extending axis. The engine must be quite compact since it is shrouded by a protective cowling.

It is, therefore, a principal object of this invention to provide an improved induction system for an outboard motor.

It is a still further object of this invention to provide an improved, compact induction system for an outboard motor that can be tuned to provide better performance over a wide range of engine speeds and loads.

It is a further object of this invention to provide a compound, tuned induction system for an outboard motor.

SUMMARY OF THE INVENTION

This invention is adapted to be embodied in an outboard motor that is comprised of a powerhead that contains a powering internal combustion engine and which is disposed over a combined drive shaft housing and lower unit that includes a propulsion device driven by the engine for propelling associated watercraft. A protective cowling encircles the engine and completes the powerhead. The engine includes at least one combustion chamber that is served by an induction system for delivering at least an air charge to the combustion chamber. The induction system is comprised of first and second plenum chambers that are disposed at different distances from the combustion chamber and which are connected to the combustion chamber through an intake arrangement. A control valve is provided in the intake arrangement for controlling the communication of the plenum chambers with the combustion chamber.

DETAILED DESCRIPTION OF THE PREFERRED EMBODIMENTS

Figure 1:
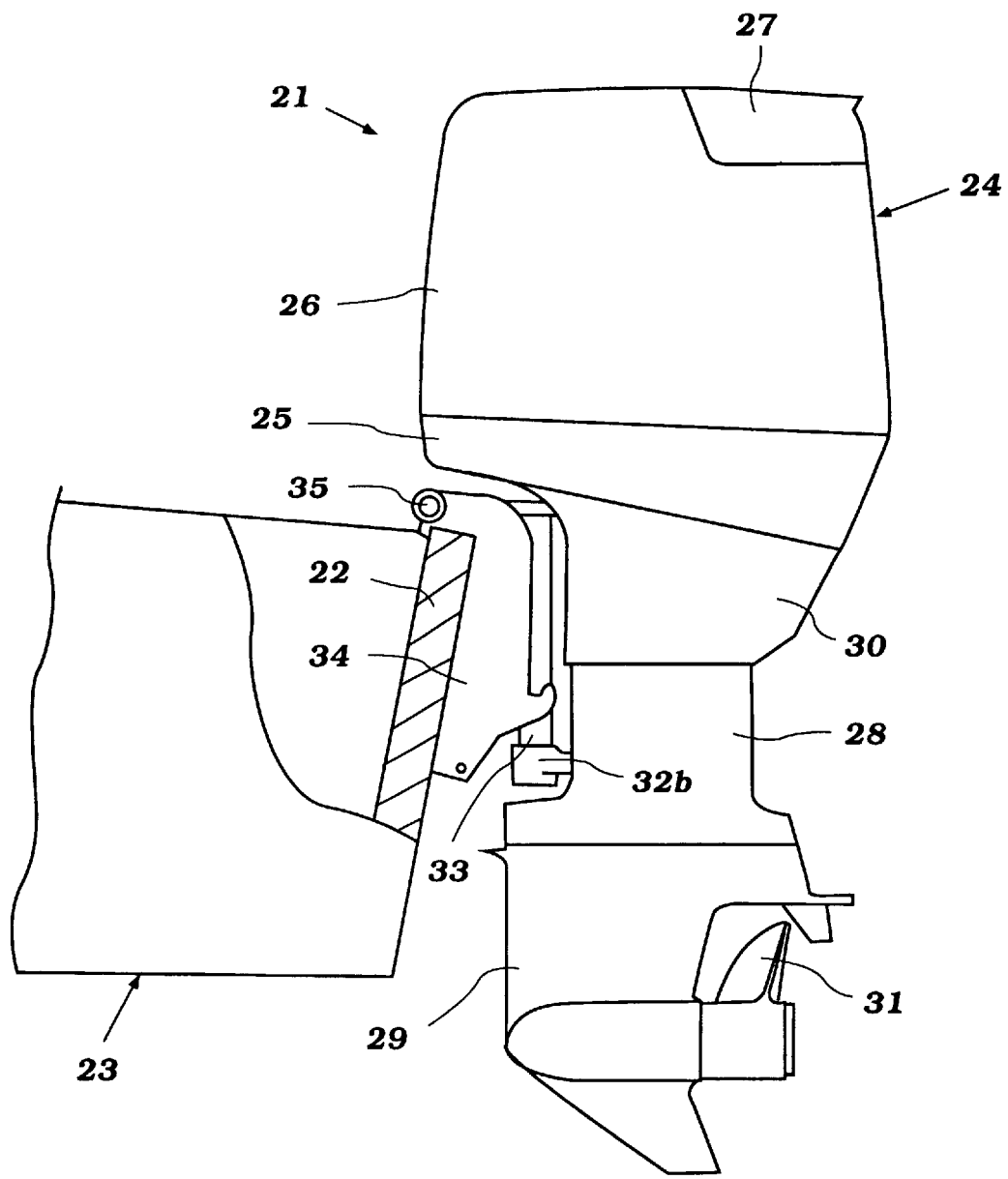
FIG. 1 is a partial side elevational view of a watercraft, shown partially and with a portion broken away and shown in section powered by an outboard motor constructed in accordance with an embodiment of the invention.

Referring to FIG. 1, an outboard motor constructed in accordance with an embodiment of the invention is identified generally by the reference numeral 21 and is shown attached to the transom 22 of a watercraft, shown partially and identified generally by the reference numeral 23. The outboard motor 21 is comprised of a powerhead assembly, indicated generally by the reference numeral 24 which contains a powering internal combustion engine, that is not seen in this figure but which will be described later by reference to FIGS. 2–5.

This internal combustion engine is surrounded by a protective cowling that is comprised of a lower tray portion 25, preferably formed from aluminum or an aluminum alloy and to which a main cowling portion 26 is detachably connected. The main cowling portion 26 is formed from a lighter weight material such as a molded fiberglass reinforced resin or the like.

The main cowling member 26 also includes a further section 27 that is connected to the upper rear portion thereof and which defines an atmospheric air intellect for admitting air to the interior of the protective cowling. This structure will also be described later by reference to the remaining figures of this embodiment.

A drive shaft housing and lower unit depends from the powerhead 24 and this is comprised of a drive shaft housing 28 and lower unit 29. The upper portion of the drive shaft housing 28 is further covered by a cowling 30 which is either affixed to or forms a part of the tray 25.

As is well known in the art, a propulsion device such as a propeller 31 is journaled in the lower unit 29 and is driven by a transmission contained therein. This transmission is powered by a drive shaft (not shown) that is rotatably journaled in the drive shaft housing 28 and lower unit 29. Since this portion of the structure may be of any type known in the art, it is not illustrated and reference may be had to known construction for application of the invention to a wide variety of types of outboard motors.

Figure 2:
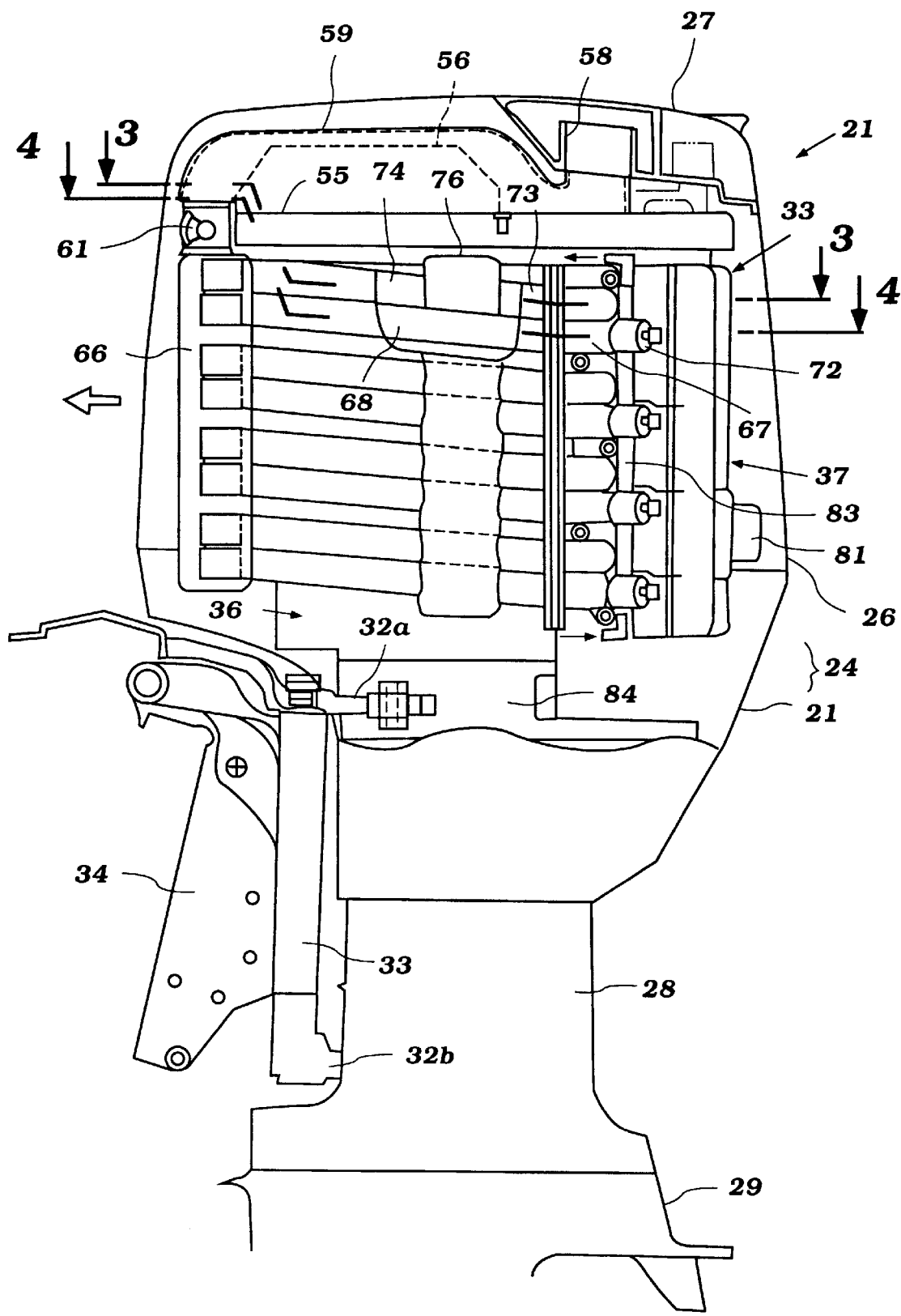
FIG. 2 is an enlarged, partial, side elevational view of the outboard motor, with portions of the protective cowling broken away to more clearly show the induction system.
Figure 3:
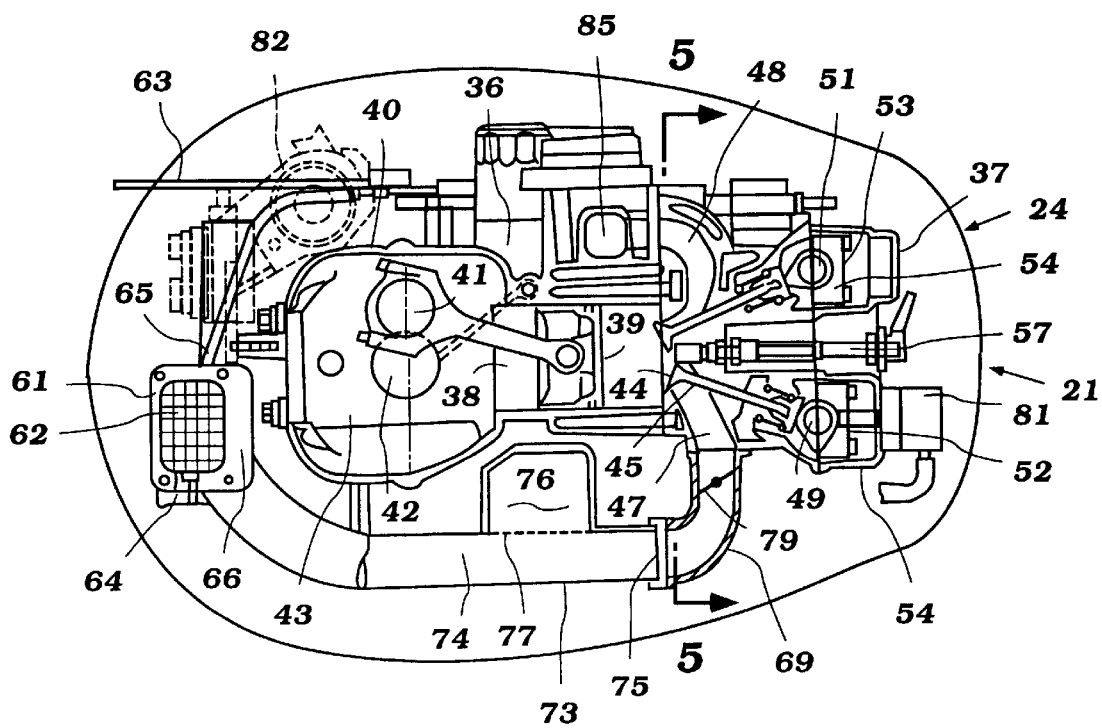
FIG. 3 is cross-sectional view taken along the line 3—3 of FIG. 2 and shows the induction system associated with one of the valves of one of the cylinders.
Figure 4:
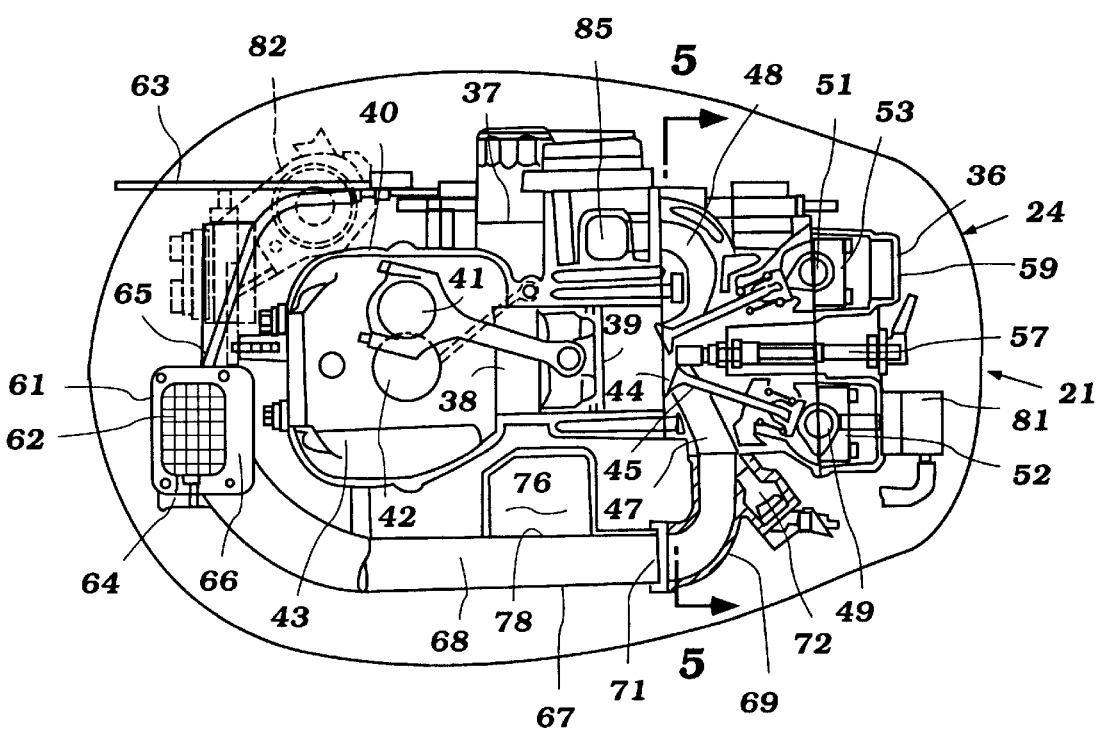
FIG. 4 is cross-sectional view taken along the line 4—4 of FIG. 2 and shows the induction system associated with the other intake valve serving the same cylinder of the engine.
Figure 5:
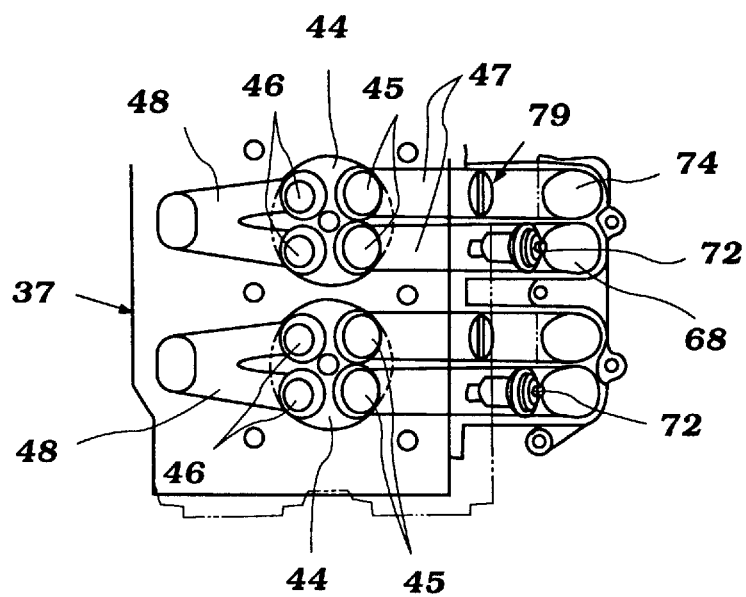
FIG. 5 is a cross-sectional view taken along the line 5—5 of FIGS. 3 and 4.

A steering shaft (not shown) is affixed to the drive shaft housing 28 in a known manner by an upper bracket, which appears in FIG. 2 and is identified by the reference numeral 32*a* and a lower bracket 32*b*. This steering shaft is journaled for a steering motion of the outboard motor 21 in a swivel bracket 33. The swivel bracket 33 is, in turn, pivotally connected to a clamping bracket 34 by a pivot pin 35. This pivotal connection permits tilt and trim movement of the outboard motor 21 as is also well known in this art. The clamping bracket 34 is detachably connected to the transom 22 in any known manner.

The construction of the outboard motor 21 as thus far described may be considered to be conventional. For that reason and as noted above, further detail of the construction is not believed to be necessary to permit those skilled in the art to practice the invention.

Referring now in detail to FIGS. 2–5, the powering internal combustion engine of the powerhead 24 is shown in detail. This engine is indicated generally by the reference numeral 35 and in this embodiment is comprised of a four cylinder inline type of four cycle engine. As also will become apparent, the engine 35 is provided with a twin overhead camshaft system and four valves per cylinder.

The engine 35 is comprised of three major structural components. These are a cylinder block, indicated generally by the reference numeral 36, a cylinder head assembly 37 which is detachably connected to one end of the cylinder block 35 and a crankcase member 40 which is detachably connected to the other end of the cylinder block member 36. The cylinder block member 36 is provided with four horizontally extending, vertically spaced cylinder bores 38. The axis of these cylinder bores ly on a common vertical plane.

Piston 39 reciprocate in these cylinder bores 38 and are connected by respective connecting rods to the throws 41 of a crankshaft, indicated generally by the reference numeral 42. The crankshaft 42 is supported for rotation in a crankcase chamber 43 formed by the skirt of the cylinder block 36 and the crankcase member 38. As is typical with outboard motor practice, the rotational axis of the crankshaft 42 is vertically disposed so as to facilitate its connection to the aforenoted drive shaft.

The cylinder head 37 closes the ends of the cylinder bores 38 opposite to the crankcase chamber 43. It is formed with individual combustion chamber recesses 44 each of which cooperates with the cylinder bores 38 and pistons 39 to form the combustion chambers of the engine.

As previously noted, the engine 35 is of the four valve per cylinder type and thus has a pair of intake valves 45 that are disposed on one longitudinal side of the engine and a pair of exhaust valves 46 that are disposed on the other side. The intake and exhaust valves 45 and 46 cooperate with respective induction and exhaust systems, as will be described.

Basically, the intake valves 45 cooperate with valve seats formed at the terminus of intake passages 47 that extend through one side of the cylinder head 37. Exhaust passages 48 extend from exhaust valve seats valved by the exhaust valves 46 through the other side of the cylinder head 37.

The intake and exhaust valves 45 an 46 are operated by overhead mounted intake and exhaust camshafts 49 and 51 respectively via thimble tappets or other suitable mechanisms. The camshafts 49 and 51 are journaled by bearing assemblies 52 and 53 that are mounted in the cylinder head 37 in a known manner and which are enclosed by cam covers 54.

The intake and exhaust camshafts 49 and 51 are driven from the crankshaft 42 by a suitable timing mechanism such as by a timing belt that is contained within a timing case cover 55 mounted at the top of the engine and beneath a flywheel magneto assembly 56 which is driven off of the upper end of the crankshaft 42. This flywheel magneto 56 supplies a charge to a ignition circuit which fires spark plugs 57 mounted in the cylinder head 37 centrally of the combustion chamber recesses. 44.

As has been noted atmospheric air is permitted to enter if the protective cowling of the powerhead 24 through an opening formed in the cover portion 27. This opening is shown in FIG. 2 and is identified therein by the reference numeral 58. This opening is disposed to the rear of the powerhead 24 and permits the air to flow forwardly through an air delivery conduit 59 to a throttle body, indicated generally by the reference numeral 61.

The throttle body 61 rotatably journals a throttle control valve 62 that is in turn controlled by a bowden wire actuator 63 via a controlling link 64 and lever 65. The lever 65 is affixed to the shaft of the throttle valve 62 and controls the flow of air through the throttle body 61.

This air then flows into a vertically-extending plenum chamber 66 which is disposed adjacent the crankcase member 40 in an area otherwise unoccupied. This permits the use of a first series of relatively long intake passages, indicated generally by the reference numeral 67 that extend along the intake side of the engine and define flow paths 68.

These flow paths 68 terminate in a short intake manifold 69 and specifically inlet end 71 thereof which serves one cylinder head passage 47 for each cylinder bore 37. The cylinder head passages 47 served by these long runners 67 are, in this embodiment, the lowermost passages for each cylinder bore 37.

Fuel injectors 72 are mounted in the intake manifold 69 and spray their fuel into the cylinder head passages 47 served by the runners 67. These may be considered to be the low speed, mid-range intake passages. Thus, there is a relatively large plenum volume provided by the plenum chamber 66 and long induction system consisting of the runner 67 manifold passages 68 and cylinder head intake passages 72. This provides a very good low speed and mid-range torque curve indicated at A in FIG. 1 which develops a maximum torque at about 3000 rpm.

As may be seen, however, this torque curve falls off quite rapidly and in order to provide improved high speed performance, a further induction system is provided for each cylinder. This further induction system comprises further runners 73 that extend from the plenum chamber 66 to the remaining intake passages 47 for each cylinder bore 38. These runners 73 define passages 74 that cooperate with inlets 75 of the manifold 69 and which serve the remaining intake passages 47. In this embodiment, these are the upper intake passages for each cylinder.

A second plenum chamber, indicated generally by the reference numeral 76 is disposed in the area between the runners 67 and 73 and the cylinder block 36 approximately midway of the straight length of the runner passages 74. An opening 77 in the runners 74 communicates this plenum chamber with the remaining cylinder head intake passages 47. It should be seen that the plenum chamber 76 extends vertically adjacent the lower runners 67 but is separated therefrom by integral walls 78.

Figure 6:
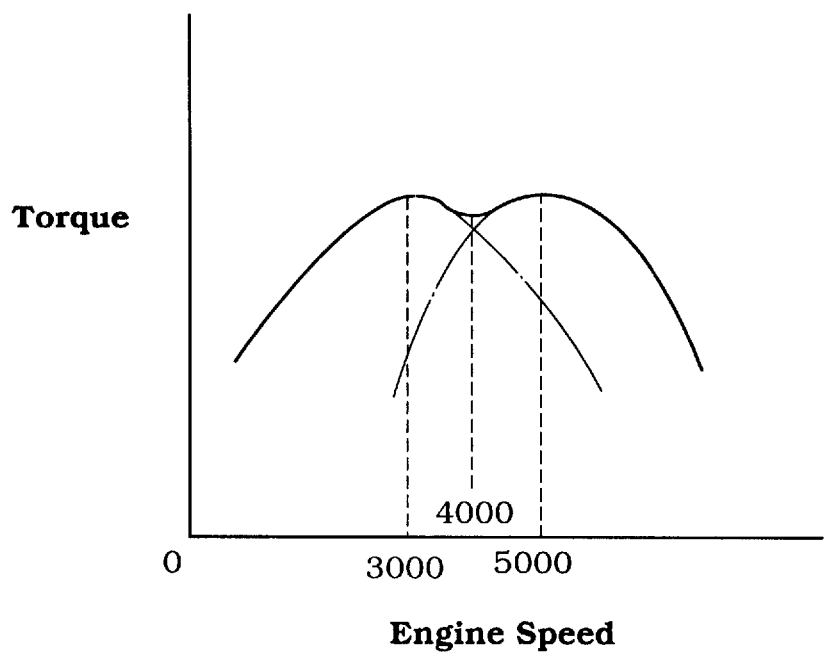
FIG. 6 is a torque curve showing how the induction system in accordance with this and later embodiment as effective to provide a good torque curve over a wide range of engine speeds and lows.

Thus, there can be a relatively large volume for the plenum chamber 76 and still a compact construction for the engine. Since the plenum chamber 76 communicates with the passages 74 and cylinder head intake passages 47 at a relatively close position to the respective combustion chambers or cylinder bores 38 they result in an induction system that has a high range torque curve as shown by the curve B in FIG. 6. This has its maximum torque at 5,000 rpm but falls off below this. Thus, the system in effect provides a split intake system for the engine 24 one having a good low speed mid-range torque curve and the other having a good high speed torque curve.

Control valves 79 are disposed in the manifold passages that serve the uppermost cylinder head intake passages 47 associated with each cylinder bore 37. These control valves 79 are operated by a suitable linkage or servo system so as to maintain a closed position under low speed and mid-range performance and open either gradually or in one step at a higher range of speed and torque. As a result, the system in effect operates as two separate induction systems but the blend-over between the two provides almost a flat torque curve between 3,000 rpm and 5,000 rpm, as may be seen in FIG. 6.

A fuel charge is supplied to the fuel injector 72 by a fuel supply system. This supply system includes a low pressure pump 81 that is driven off of the intake camshaft and which fuel from a remote tank. This fuel is then delivered to a vapor separator 82 in which a high pressure pump may be provided which delivers fuel to the injector 72 through a fuel rail 83. A pressure relief valve (not shown) is provided in this system preferably at the fuel rail 83 and controls maximum fuel pressure by dumping fuel back to the vapor separator 82 from the fuel rail 83.

The engine 35 is mounted in the powerhead 24 on a spacer plate 84 (FIG. 2). An exhaust passage is provided in this spacer plate and it communicates with the cylinder head exhaust passages 51 through the exhaust system now to be described.

The cylinder head exhaust passages 48 curve and exit through a lower surface of the cylinder head 37 to communicate with an exhaust manifold 85 formed in the cylinder block 36. This exhaust manifold 85 delivers the exhaust gasses downwardly to the spacer plate or guide plate 84 and then into a suitable type of exhaust system provided in the drive shaft housing.

Figure 7:
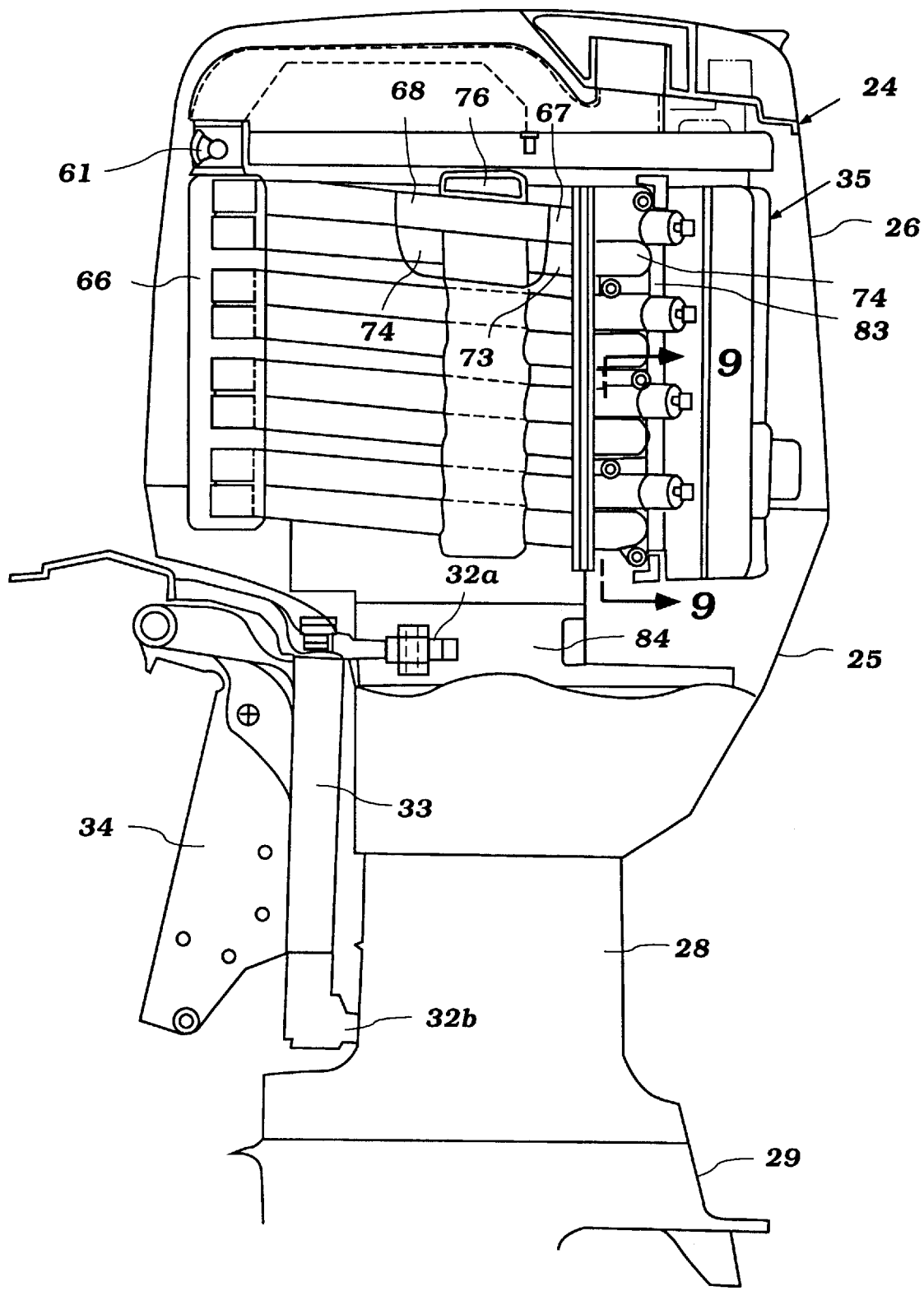
FIG. 7 is a side elevational view, with a portion broken away, in part similar to FIG. 2, and shows another embodiment of the invention.
Figure 8:
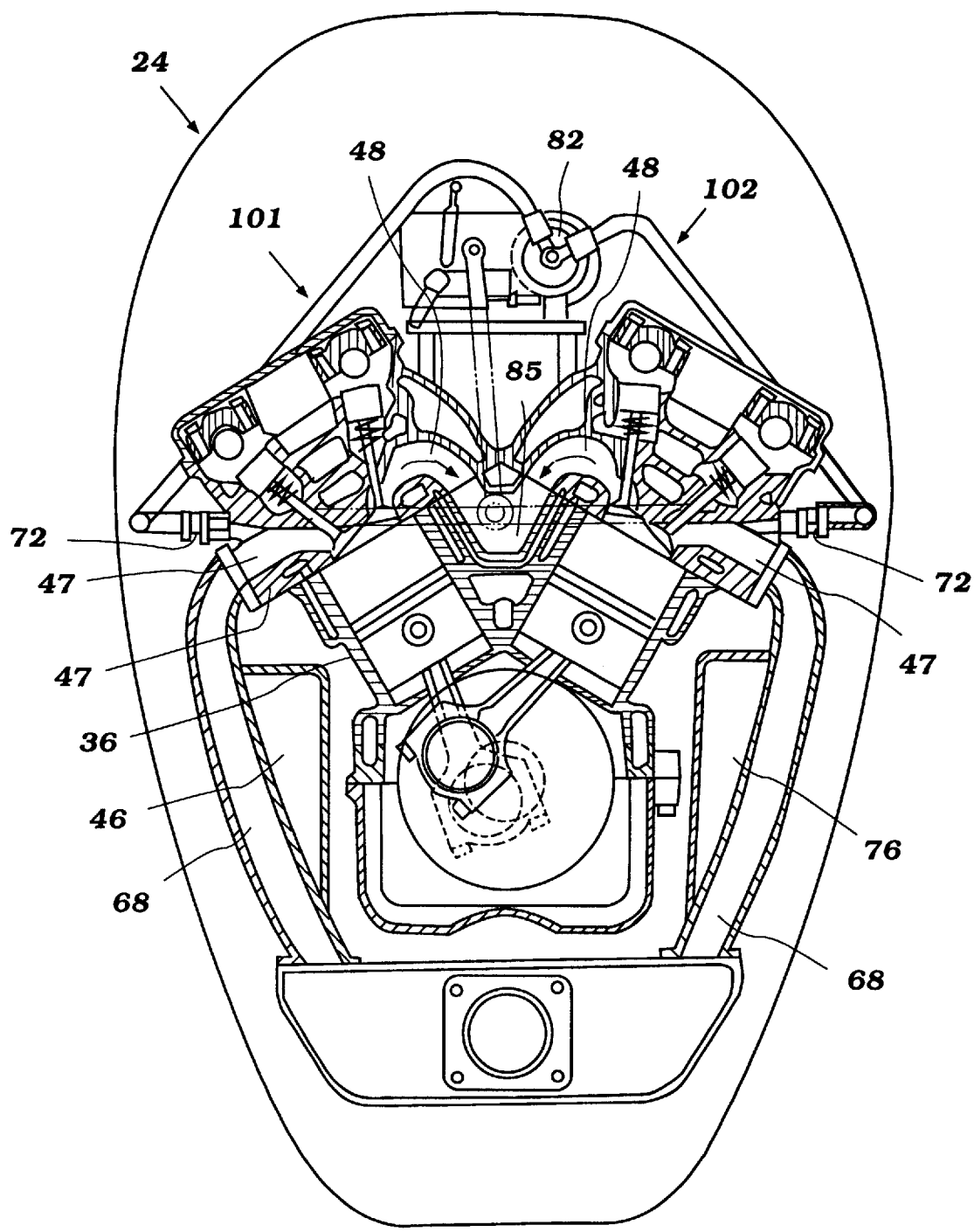
FIG. 8 is a cross-sectional view of this embodiment taken through the engine and showing the relationship to the protective cowling.
Figure 9:
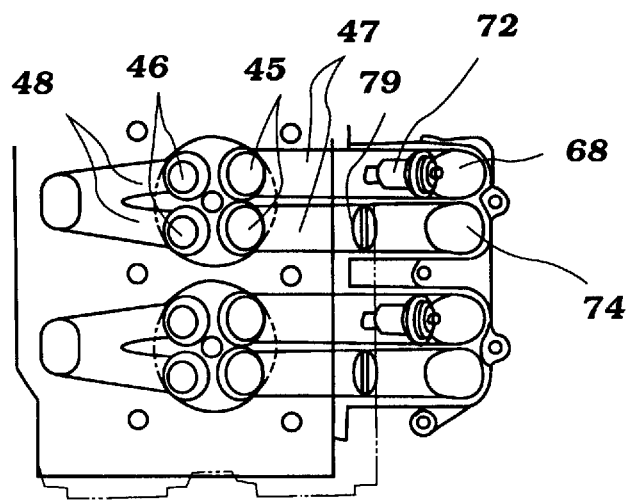
FIG. 9 is a cross-sectional taken along the line 9—9 of FIG. 7 and shows the throttle valve arrangement of this embodiment.

FIG. 7–9 shows another embodiment of the invention which is basically the same as the embodiment thus far described but shows how this principal can be applied to V-type engine. In this embodiment, the engine is formed so that the cylinder block, which is also indicated by the reference numeral 36 due to its similarity to the previously described embodiment, has a pair of angularly disposed cylinder banks 101 and 102.

The banks 101 and 102 are disposed so that each has its intake passages 47 disposed on the outer sides of the engine with the exhaust passages 48 being disposed centrally so that a single exhaust manifold 85 can be formed in the valley between the cylinder banks 101 and 102.

The plenum chamber 66 in this embodiment extends transversely across the lower end of the crankcase member 40 and serves intake runners 67 and 73 for the intake passages of each cylinder block. In this embodiment, the second plenum chambers 76, there being one for each cylinder bank, are disposed on the sides of the cylinder block 36 and also extend in part along the sides of the crankcase chamber 43. In this way, each second plenum chamber 76 may have a slightly different volume if desired so as to improve the engine performance.

In this embodiment, the control valves 79 are provided in the lowermost rather than uppermost intake passages for each cylinder head recessed 44. Thus, the fuel injectors 72 for this embodiment serve the uppermost intake passages for each cylinder head.

In all other regards, this embodiment is the same as that previously described, like components have been identified by the same reference numerals and further description of them is not believed to be necessary to permit those skilled in the art to practice the invention.

It should be noted that in the two embodiments described, since the control valves 79 are provided close to the cylinder head intake passages their opening and closing may also be utilized so as to induce swirl in the combustion chambers at low speeds and midrange when the intake charge is supplied primarily through the remaining intake passages.

Figure 10:
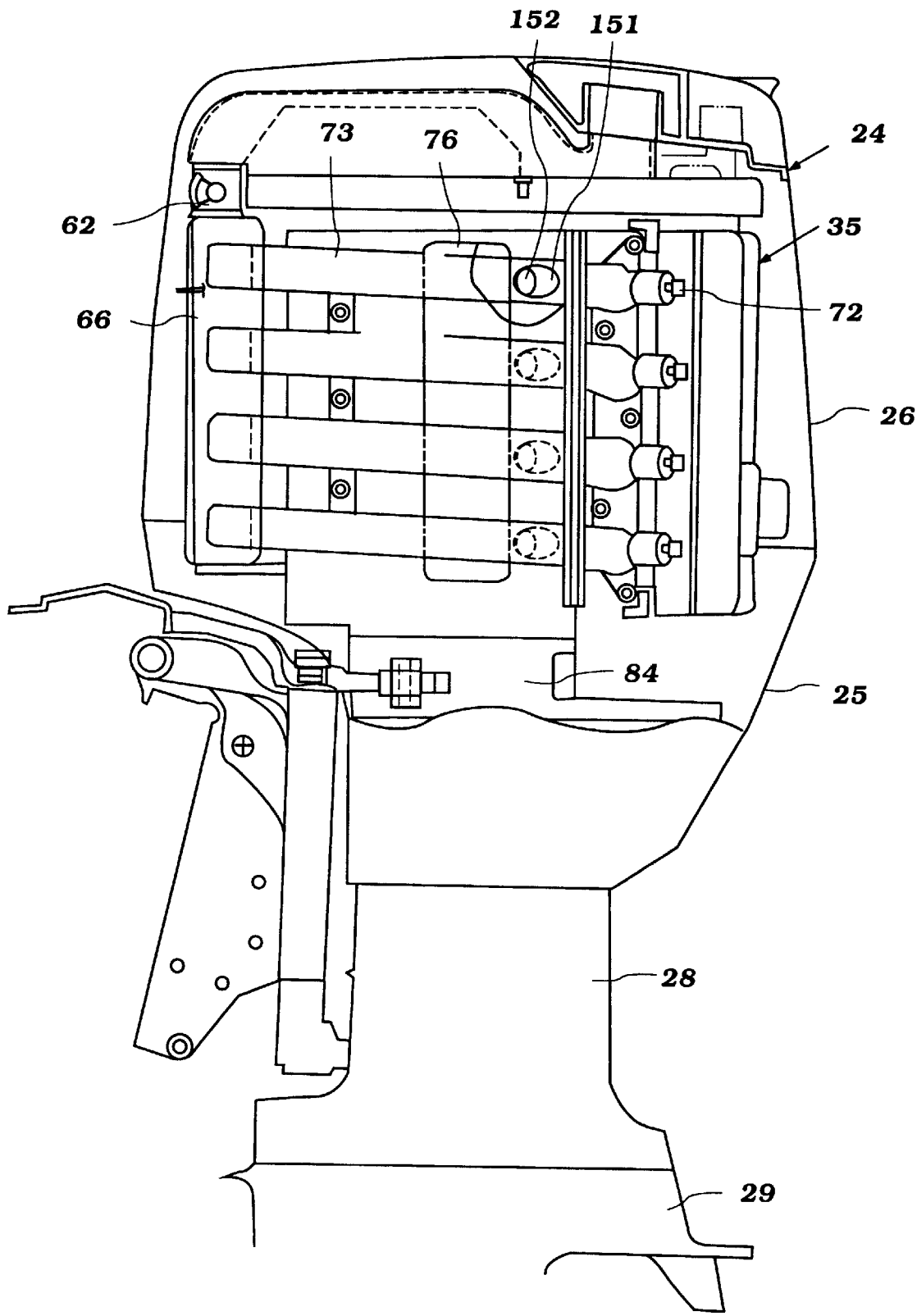
FIG. 10 is a side elevational view, with a portion broken away, in part similar to FIGS. 2 and 7 and shows yet another embodiment of the invention.
Figure 11:
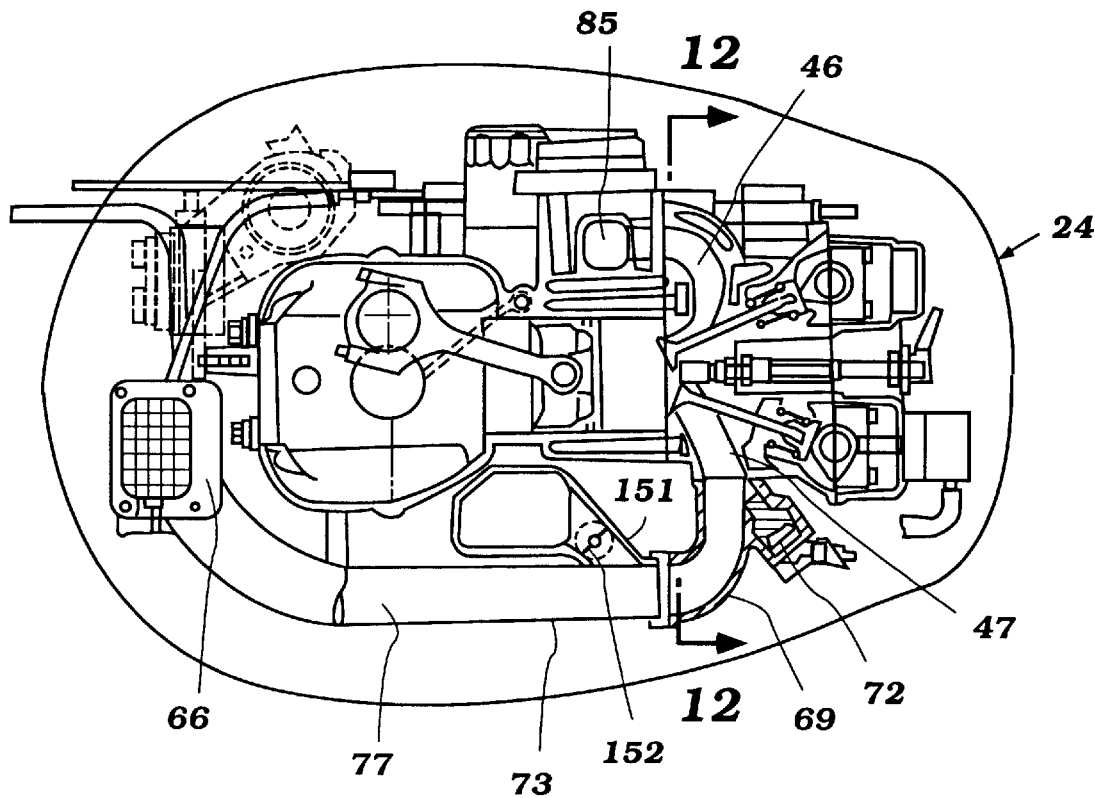
FIG. 11 is a top plan view, with portions broken away and shown in section, and is in part similar to FIGS. 3, 4 and 8 for this embodiment of the invention.
Figure 12:
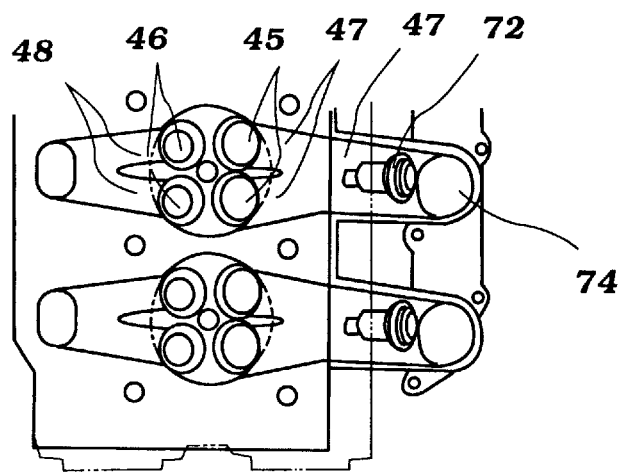
FIG. 12 is a cross-sectional view taken along the line 12—12 of FIGS. 11.

FIGS. 10–12 show another embodiment wherein the control valves are positioned in a different location so that a charge will enter the combustion chamber through both intake passages 47, which are Siamesed in this embodiment, under all running conditions. In this embodiment, which is an inline type as shown in FIGS. 1–5 but which can also be utilized with a V-type engine, the secondary plenum chambers 76 serve the single runners 73 extending from the plenum chamber 66 to the Siamesed intake passages through short branch passage ways 151. Control valves 152 which are operated in the manner previously described, are provided in these passage ways 151. The injectors 82 thus serve both intake valves 45.

Thus, with this embodiment, it is possible to use a Siamese-type intake arrangement and the tuning will be for both intake valves for each cylinder rather than only one intake valve. However, this arrangement does not facilitate its utilization to generate swirl. Although other types of motion such as tumble can be generated.

Thus, from the foregoing description it should be readily apparent that the described embodiments of the invention provide a very compact yet widely tuned range of running for the internal combustion engines of outboard motors. Thus, good performance can be obtained and compact construction results. Of course, the foregoing description is that of preferred embodiments of the invention and various changes and modifications may be made without departing from the spirit and scope of the invention, as defined by the appended claims.

I claim:

1. An outboard motor comprised of a powerhead consisting of an internal combustion engine and a surrounding protective cowling, a drive shaft housing and lower unit depending from said powerhead and containing a propulsion unit driven by said engine for propelling an associated watercraft, an induction system for supplying at least an air charge to at least one combustion chamber of said engine, said induction system comprising first and second plenum chamber devices disposed at different distances from said combustion chamber, induction passage means communicating said plenum chamber devices with said combustion chamber, and a control valve for controlling the communication of at least one of said plenum chamber devices with said combustion chamber.

2. An outboard motor as set forth in claim 1, wherein the induction passage means comprises a common section communicating each of the plenum chamber devices with the combustion chamber.

3. An outboard motor as set forth in claim 2, wherein the control valve means is disposed at the juncture of one of the plenum chamber devices with the induction passage means for controlling the communication of that plenum chamber device with the induction passage means.

4. An outboard motor as set forth in claim 1, wherein the engine is provided with a pair of intake valves serving the combustion chamber and a pair of intake passages each served by the induction passage means and for delivering a charge to the combustion chamber.

5. An outboard motor as set forth in claim 4, wherein control valves means controls the flow through one of the cylinder head intake passages.

6. An outboard motor as set forth in claim 5, wherein the other of the plenum chamber devices serves both of the intake passages.

7. An outboard motor as set forth in claim 5, wherein further including a fuel injector for injecting fuel into only one of the cylinder head intake passages.

8. An outboard motor as set forth in claim 7, wherein the fuel injected by fuel injector into the intake passage not served by the one plenum chamber device.

9. An outboard motor as set forth in claim 1, wherein the engine is provided with a cylinder block having at least one cylinder bore forming in part the combustion chamber, a crankcase member closing one end of the cylinder bore and a cylinder head affixed to the cylinder block and closing the other end of the cylinder bore, the intake passages being formed in the cylinder head, the first plenum chamber device being disposed adjacent to the crankcase chamber.

10. An outboard motor as set forth in claim 9, wherein the second plenum chamber device is disposed between the induction passage means and the cylinder block at one side of said cylinder block.

11. An outboard motor as set forth in claim 9, wherein the cylinder block is formed with a plurality of vertically spaced, horizontally spaced cylinder bores each served by the first and second plenum chamber devices through respective intake passage means having a respective control valve.

12. An outboard motor as set forth in claim 10, wherein the second plenum chamber device is disposed between the induction passage means and the cylinder block at one side of said cylinder banks.

13. An outboard motor as set forth in claim 8, wherein the engine is formed with a pair of cylinder banks each having at least one cylinder bore and the intake passages of the cylinder heads for each bank are disposed on the outer side thereof and the first plenum chamber serves both of the cylinder banks.

14. An outboard motor as set forth in claim 13, wherein there are a pair of second plenum chamber devices each disposed between the respective induction passage means and the respective cylinder bank.

15. An outboard motor as set forth in claim 14, wherein each bank of the cylinder block is formed with a plurality of vertically spaced, horizontally spaced cylinder bores each served by the first and second plenum chamber devices through respective intake passage means having a respective control valve.

16. An outboard motor as set forth in claim 15, wherein the second plenum chamber devices is disposed between the induction passage means and the respective bank of the cylinder block on the outer sides of said cylinder block.

\* \* \* \* \*

UNITED STATES PATENT AND TRADEMARK OFFICE
CERTIFICATE OF CORRECTION

PATENT NO. : 5,855,193
DATED : January 5, 1999
INVENTOR(S) : Masanori Takahashi

It is certified that error appears in the above-identified patent and that said Letters Patent is hereby corrected as shown below:

<u>Claim 12,</u>
Line 10, please delete -- cylinder banks -- and replace with -- cylinder block --

Signed and Sealed this

Nineteenth Day of March, 2002

*Attest:*

JAMES E. ROGAN
*Attesting Officer*  *Director of the United States Patent and Trademark Office*